US005261800A

United States Patent [19]

[11] Patent Number: 5,261,800
[45] Date of Patent: Nov. 16, 1993

Sakae

[54] COMPRESSOR, AND METHOD OF MANUFACTURING SAME INCLUDING A PRESS-FIT INLET TUBE

[75] Inventor: Shunichi Sakae, Shiga, Japan

[73] Assignee: Daikin Industries, Ltd., Osaka, Japan

[21] Appl. No.: 917,295

[22] Filed: Jul. 23, 1992

[30] Foreign Application Priority Data

Jul. 30, 1991 [JP] Japan ................................ 3-190232

[51] Int. Cl.[5] ...................... F04C 29/00; F04B 39/00; B23K 1/00; B23P 11/02

[52] U.S. Cl. ...................................... 418/63; 417/902; 29/525; 29/888.025

[58] Field of Search .......................... 418/63; 417/902; 29/505, 525, 888.025; 285/158, 381

[56] References Cited

U.S. PATENT DOCUMENTS 3,554,676 1/1971 Porteous .............................. 418/63
3,767,334 10/1973 Rinehart ............................. 417/902

FOREIGN PATENT DOCUMENTS 57-56694 4/1982 Japan .................................. 417/902
57-129285 8/1982 Japan .................................. 417/902
57-129286 8/1982 Japan .................................. 417/902
3-31595 2/1991 Japan .................................... 418/63

*Primary Examiner*—John J. Vrablik
*Attorney, Agent, or Firm*—Sughrue, Mion, Zinn, Macpeak & Seas

[57] ABSTRACT

An object of this invention is to provide a compressor in which the number of components and the number of manufacturing steps are reduced, and a compression element is prevented from being displaced in the casing, whereby the air gap between the rotor and the stator of the motor is held unchanged at all times. In a compressor, a connecting cylinder 11*a* is formed on the casing 1 having a connecting opening 11 such that it is extended from the connecting opening outwardly of the casing, and an inlet tube 6 has a first press-fitting portion 61 which is press-fitted into a refrigerant suction opening 31*a* and a second press-fitting portion 62 which is press-fitted into the connecting cylinder 11*a*. The inlet tube 6 is fixedly secured to the casing 1 by press-fitting it into the refrigerant suction opening 31*a* and the connecting cylinder 11*a*, whereby the compression element 3 is prevented from being displaced in the casing. The compression element 3 is prevented from being displaced in the casing 1 by means of the inlet tube 6. Therefore, the compression element 3 is prevented from being displaced when spot-welded; that is, the air gap between the rotor and the stator in the motor can be maintained unchanged at all times.

5 Claims, 2 Drawing Sheets

PRIOR ART

COMPRESSOR, AND METHOD OF MANUFACTURING SAME INCLUDING A PRESS-FIT INLET TUBE

BACKGROUND OF THE INVENTION

1. Field of the Industrial Application

This invention relates to a compressor in which a compression element with a refrigerant suction opening is built in a casing, a connecting opening is formed in the casing at the position corresponding to the position of the refrigerant suction opening, and a refrigerant pipe is connected to the refrigerant suction opening of the compression element through an inlet tube inserted into the connecting opening, and to a method of manufacturing the compressor.

2. Description of the Prior Art

A compressor of this type, in which the refrigerant pipe is connected to the refrigerant suction opening of the compression element built in the casing, has been disclosed, for instance, by Japanese Utility Patent Application (OPI) No. 74587/1990 (the term "OPI" as used herein means an "unexamined published application"), and is as shown in FIG. 3. In the compressor, a coupling pipe B and an inlet tube F are used. The coupling pipe B is connected to a connecting opening C1 formed in the casing C by brazing. The inlet tube F is loosely inserted into the coupling pipe B, and then the end portion of the inlet tube F is press-fitted into a refrigerant suction opening A of a compression element CP which is incorporated in the casing C. Under this condition, the coupling pipe B is welded to the inlet tube F by brazing, and the inlet tube F is also welded to a refrigerant pipe D by brazing which is inserted into the inlet tube F.

The compression element CP is built in the casing C by coupling it to an electric motor M which is secured therein by shrinkage fitting, and it is secured to the casing C by spot-welding, with the inlet tube F connected to the refrigerant pipe D and to the coupling pipe B by brazing.

As was described above, the conventional compressor employs the coupling pipe B. The coupling pipe B must be fixedly secured to the connecting opening C1 of the casing C by welding. In welding the coupling pipe B with the compression element CP set in the casing, it is necessary to take thermal effects into account. In securing the compression element CP to the casing C by spot welding, before the inlet tube F is welded to the coupling pipe B the compression element CP is positioned in place, and a predetermined air gap E is set between the rotor RT and the stator ST of the motor. In this operation, the inlet tube F is inserted into the coupling pipe B with a gap therebetween, and therefore the compression element CP is liable to be displaced with respect to the casing C. As a result, the air gap E between the stator ST and the rotor RT of the motor M is changed; that is, it is difficult to maintain the air gap E unchanged.

SUMMARY OF THE INVENTION

In view of the foregoing, an object of this invention is to provide a compressor in which not only the number of components but also the number of manufacturing steps is reduced, and displacement of the compression element in the casing is prevented, whereby the air gap between the rotor and stator of the motor is maintained unchanged at all times.

The foregoing object of the invention has been achieved by the provision of a compressor in which a compression element 3 with a refrigerant suction opening 31*a* is built in a casing 1 which has a connecting opening 11 at the position corresponding to the position of the refrigerant suction opening 31*a*, and a refrigerant pipe 7 is connected to the compression element 3 through an inlet tube 6 which is inserted into the connecting opening 11; in which, according to the invention, a connecting cylinder 11*a* is formed integral with the casing 1 in such a manner that the connecting cylinder 11*a* is extended from the connecting opening 11 outwardly of the casing 1, and the inlet tube 6 has a first press-fitting portion 61 which is press-fitted into the refrigerant suction opening 31*a*, and a second press-fitting portion 62 which is press-fitted into the connecting cylinder 11*a*, the inlet tube 6 being fixed, when press-fitted into the refrigerant suction opening 31*a* and the connecting cylinder 11*a*.

In the compressor, the inlet tube 6 may have a large diameter portion 63 on the side of the refrigerant pipe 7 which is substantially equal in outside diameter to the connecting cylinder 11, and merges through a step 64 with the second press-fitting portion 62 of the inlet tube.

Furthermore in the compressor, the inlet tube 6 may be so designed as to be integral with the refrigerant pipe 7 which is connected to an accumulator 100.

In addition, in the compressor, the inlet tube 6 press-fitted into the connecting cylinder 11*a* may be welded to the outer end face of the connecting cylinder 11*a* with a ring solder 81.

In manufacturing the compressor thus constructed in which, as was described above, the compression element 3 with the refrigerant suction opening 31*a* is built in the casing 1 which has the connecting opening 11 at the position corresponding to the position of the refrigerant sucking hole 31*a*, the connecting cylinder 11*a* is formed integral with the casing 1 in such a manner that the connecting cylinder is protruded from the connecting opening 11 outwardly of the casing 1, and the refrigerant pipe 7 is connected to the compression element 3 through the inlet tube 6 which is press-fitted into the refrigerant suction opening 31*a* and the connecting cylinder 11*a;* according to the invention, the compression element 3 is set in the casing 1 with the refrigerant suction opening 31*a* held confronted with the connection cylinder 11*a* in such a manner that the compression element 3 is prevented from being displaced vertically (a first step), the inlet tube 6 is press-fitted into the refrigerant suction opening 31*a* and the connecting cylinder 11*a* in such a manner that the compression element 3 is prevented from being turned around with respect to the casing 1 (a second step), the casing 1 and the compression element 3 are fixed by spot welding with spot weld 160 (a third step); and the inlet tube 6 is fixedly welded to the connecting cylinder (a fourth step).

In the compressor, the first press-fitting portion 61 of the inlet tube 6 is press-fitted into the refrigerant suction opening 31*a* while the second press-fitting portion 62 is press-fitted into the connecting cylinder 11*a*, so that the inlet tube 6 is fixedly secured to the compression element 3 and the casing 1, being held by the refrigerant suction opening 31*a* and the connecting cylinder 11*a;* that is, the inlet tube 6 is secured directly to the casing 1. Hence, in manufacturing the compressor of the invention, unlike the conventional one, it is unnecessary to use the coupling pipe, and therefore the number of components is reduced as much; and furthermore the step of connecting the coupling pipe to the casing by brazing is unnecessary, and therefore the number of manufacturing steps is also reduced as much, which results in a reduction in manufacturing cost. In addition, in the compressor, it is unnecessary to take into account the effects of heat used for welding the coupling pipe. Furthermore, when the inlet tube 6 is secured by press-fitting it into the refrigerant suction opening 11a and the connecting cylinder 11a, the compression element 3 is prevented from being displaced in the casing 1. Hence, in connecting the compression element 3 to the casing 1 by spot-welding, the air gap between the rotor and the stator of the motor is prevented from being changed during the spot welding operation. Furthermore, in fixing the inlet tube, for instance, by welding, the internal components of the compression element 3 are scarcely affected by heat.

The inlet tube 6 can be more positively connected to the casing 1 when it is so modified that the outer part of the second press-fitting portion 62, which is engaged with the refrigerant pipe 7, has the large diameter portion 63 which is substantially equal in outside diameter to the refrigerant pipe 7 and merges through the step 64 with the inner part of the second press-fitting portion 62. That is, the inlet tube 6 thus modified can be connected to the casing 1 not only by brazing but also by resistance welding such as projection welding. Hence, even if the welding method is changed, it is unnecessary to change the inlet tube; that is, the inlet tube can be used as it is.

In the case where the inlet tube 6 is made integral with the refrigerant pipe 7 which is connected to the accumulator 100, it is unnecessary to form the inlet tube 6 as a separate component, and accordingly both the number of components and the number of manufacturing steps are reduced as much, with a result that the resultant compressor is further reduced in manufacturing cost.

Furthermore, in the compressor of the invention, the outer end face of the connecting cylinder 11a is welded to the inlet tube 6 press-fitted into the cylinder 11a with the ring solder 81, which permits introduction of an automatic welding operation into the manufacture. In addition, the heat for welding the refrigerant pipe 7 to the inlet tube 6 is transmitted through the inlet tube 6 to heat the ring solder 81 put on the connecting cylinder 11a, so that the period of time required for welding the inlet tube 6 to the connecting cylinder 11a is shortened as much. Hence, in welding the inlet tube 6 to the connecting cylinder 11a, the effect of the produced heat on the internal components of the compression element 3 is lessened.

In manufacturing the inventive compressor the compression element 3 is set in the casing 1 with the refrigerant suction opening 31a held confronted with the connection cylinder 11a in such a manner that the compression element 3 is prevented from being displaced vertically (the first step), the inlet tube 6 is press-fitted into the refrigerant suction opening 31a and the connecting cylinder 11a in such a manner that the compression element 3 is prevented from being turned around with respect to the casing 1 (the second step), the casing 1 and the compression element 3 are fixed by spot welding with spot weld 160 (the third step); and the inlet tube 6 is fixedly welded to the connecting cylinder (the fourth step). That is, in fixing the compression element 3 and the casing 1 by spot welding, the compression element 3 is prevented from being moved vertically and from being turned around because the inlet tube 6 has been press-fitted into the refrigerant suction opening 31a and the connecting cylinder 11a. Hence, the compression element 3 is prevented from being displaced during the spot welding operation, and accordingly the air gap between the rotor and the stator in the motor is maintained unchanged at all times. This will facilitate the spot welding operation greatly.

BRIEF DESCRIPTION OF THE DRAWING(S)

DETAILED DESCRIPTION OF THE PREFERRED EMBODIMENTS

Preferred embodiments of this invention will be described with reference to the accompanying drawings.

Figure 1:
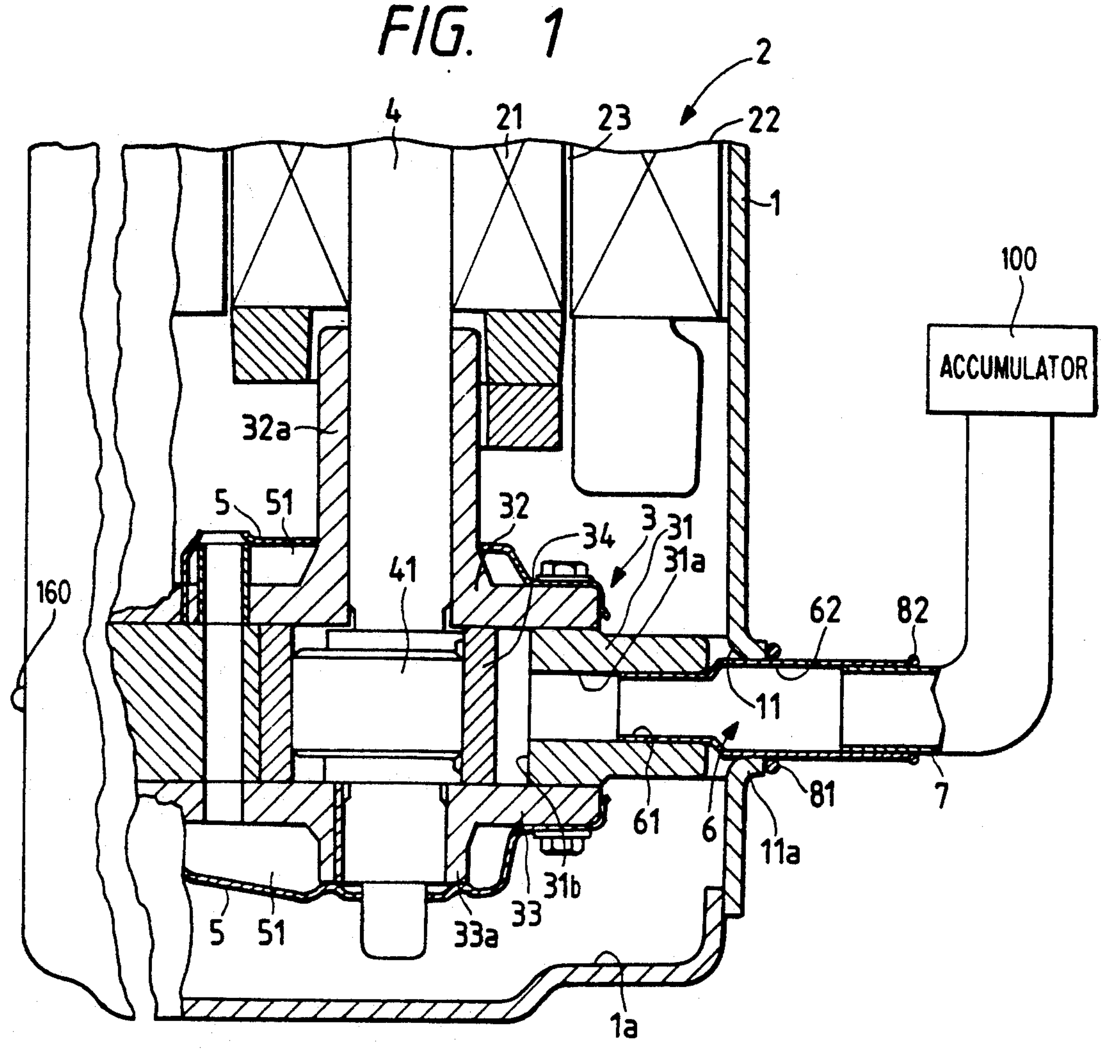
FIG. 1 is a sectional view, with parts cut away, showing a part of a compressor, which constitutes one embodiment of this invention.

A compressor, which constitutes one embodiment of the invention, as shown in FIG. 1, comprises: a hermetical seal type casing 1 with an oil pool 1a at the bottom; an electric motor 2 having a rotor 21 and a stator 22 built in the casing and a compression element 3 below the motor 2. The compression element 3 includes a cylinder 31, and a front head 32 and a rear head 33 which are positioned on the upper half and the lower half of the cylinder 31, respectively. A bearing 32a is extended upwardly from the front head 32, and a bearing 33a is extended downwardly from the rear head 33. Those bearings 32a and 33a support a drive shaft 4. The drive shaft 4 thus supported has one end portion coupled to the motor 2, and an eccentric portion 41 on which a roller 34 is mounted.

The cylinder 31 has a refrigerant sucking hole 31a for sucking a low pressure gas refrigerant, and a cylinder chamber 31b for compressing the gas refrigerant which flows into it through the refrigerant suction opening 31a. The front head 32 and the rear head 33 are provided with discharge mufflers 5 and 5, respectively, which form upper and lower discharge chambers 51 and 51 for the gas refrigerant compressed in the cylinder 31, respectively.

A connecting opening 11 larger in diameter than the refrigerant suction opening 31a is formed in the lower wall of the casing 1 at the position corresponding to the position of the refrigerant suction opening 31a. An inlet tube 6 is inserted into the connecting opening 11. Under this condition, one end of the inlet tube 6 is connected to the refrigerant suction opening 31a, and the other end is connected to a refrigerant pipe 7 extended from an accumulator (not shown).

As the motor 2 is rotated, the roller 34 is rotated, so that the gas refrigerant is sucked into the cylinder 31 through the refrigerant suction opening 31a from the refrigerant pipe 7. The gas refrigerant is compressed by rotation of the roller 34. The gas refrigerant thus compressed is discharged into the upper and lower discharge chambers 51 and 51, and then discharged into a primary discharge space 10 in the casing 1.

In the above-described compressor of the invention, a connecting cylinder 11a is formed on the casing 1 in such a manner that it is extended from the connecting opening 11 outwardly of the casing and tapered off. The inlet tube 6 is made of iron and is plated with copper. The inlet tube 6 has a first press-fitting portion 61 and a second press-fitting portion 62. The outside diameter of the first press-fitting portion 61 is slightly larger than the inside diameter of the refrigerant suction opening 31*a*. The first press-fitting portion 61 is press-fitted into the refrigerant suction opening 31*a* in such a manner that the outer cylindrical surface of the first press-fitting portion 61 is pushed against the inner cylindrical surface of the refrigerant suction opening 31*a*. The outside diameter of the second press-fitting portion 62 is slightly larger than the inside diameter of the connecting cylinder 11*a*. The second press-fitting portion 62 is press-fitted into the connecting cylinder 11*a* in such a manner that the outer cylindrical surface of the second press-fitting portion 62 is pushed against the inner cylindrical surface of the connecting cylinder 11*a*. That is, the inlet tube 6 is secured to the casing 1 by press-fitting it into the refrigerant suction opening 31*a* and the connecting cylinder 11*a*. The inlet tube 6 thus secured is connected to the aforementioned refrigerant pipe 7. Under this condition, the inlet tube 6 is fixedly secured by connecting it to the connecting cylinder 11*a* and to the refrigerant pipe 7 by brazing.

As was described above, in the embodiment, the inlet tube 6 is secured directly to the casing 1. Hence, in manufacturing the compressor of the invention, unlike the conventional one, it is unnecessary to use the coupling pipe, and therefore the number of components is reduced as much; and furthermore the step of connecting the coupling pipe to the casing by brazing is unnecessary, and therefore the number of manufacturing steps is reduced as much, which results in a reduction in manufacturing cost. In addition, in the embodiment, it is unnecessary to take into account the effects of heat used for welding the coupling pipe. Furthermore, when the inlet tube 6 is secured by press-fitting it into the refrigerant suction opening 31*a* and the connecting cylinder 11*a*, the compression element 3 is fixedly held in the casing 1. Hence, in connecting the compression element 3 to the casing 1 by spot-welding, the displacement of the compression element 3 can be minimized, and accordingly the displacement of the drive shaft 4 coupled to the compression element 3 is suppressed; that is, the displacement of the rotor 21 mounted fixedly on the drive shaft 4 is suppressed. Accordingly, the air gap 23 between the rotor 21 and the stator 22 is maintained unchanged, so that the air gap is prevented from being changed during the spot welding operation. Furthermore, in connecting the inlet tube to the casing 1 by welding or the like, the welding operation is carried out at the outer end of the connecting cylinder 11*a*, and therefore the internal components of the compression element 3 are scarcely affected by heat.

It is preferable that the inlet tube 6 is welded to the connecting cylinder 11*a* as follows: As shown in FIG. 1, a silver ring solder 81 is put on the inlet tube 6 at the outer end of the connecting cylinder, and another ring solder 82 is put on the refrigerant pipe 7, and then the pipe 7 is engaged with the inlet tube 6. First, the refrigerant pipe 7 is fixedly connected to the inlet tube 6 by using the ring solder 82, and then the tube 6 is fixedly connected to the connecting cylinder 11*a*. In this operation, the heat for welding the refrigerant pipe 7 to the inlet tube 6 is transmitted through the inlet tube 6 to heat the ring solder 81 on the connecting cylinder 11*a*, and accordingly the period of time required for welding the inlet tube 6 to the connecting cylinder 11*a* is shortened as much. Hence, in welding the inlet tube 6 to the connecting cylinder 11*a*, the effect of the produced heat on the internal components of the compression element 3 is lessened. Furthermore, in the embodiment, under the condition that the inlet tube 6 is press-fitted into the connecting cylinder 11 and engaged with the refrigerant pipe 7, the ring solders 81 and 82 are put on them. Hence, a high frequency welding operation, that is, an automatic welding operation can be employed. The silver ring solder may be replaced with a thermo-setting resin ring.

Figure 2:
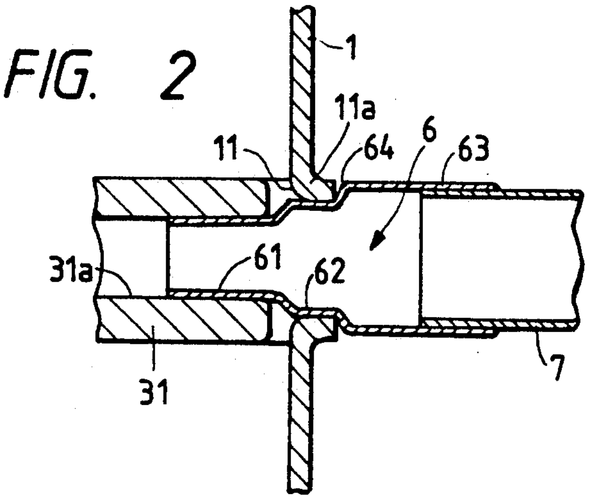
FIG. 2 is a sectional view for a description of another embodiment of the invention, showing a modification of an inlet tube.
Figure 3:
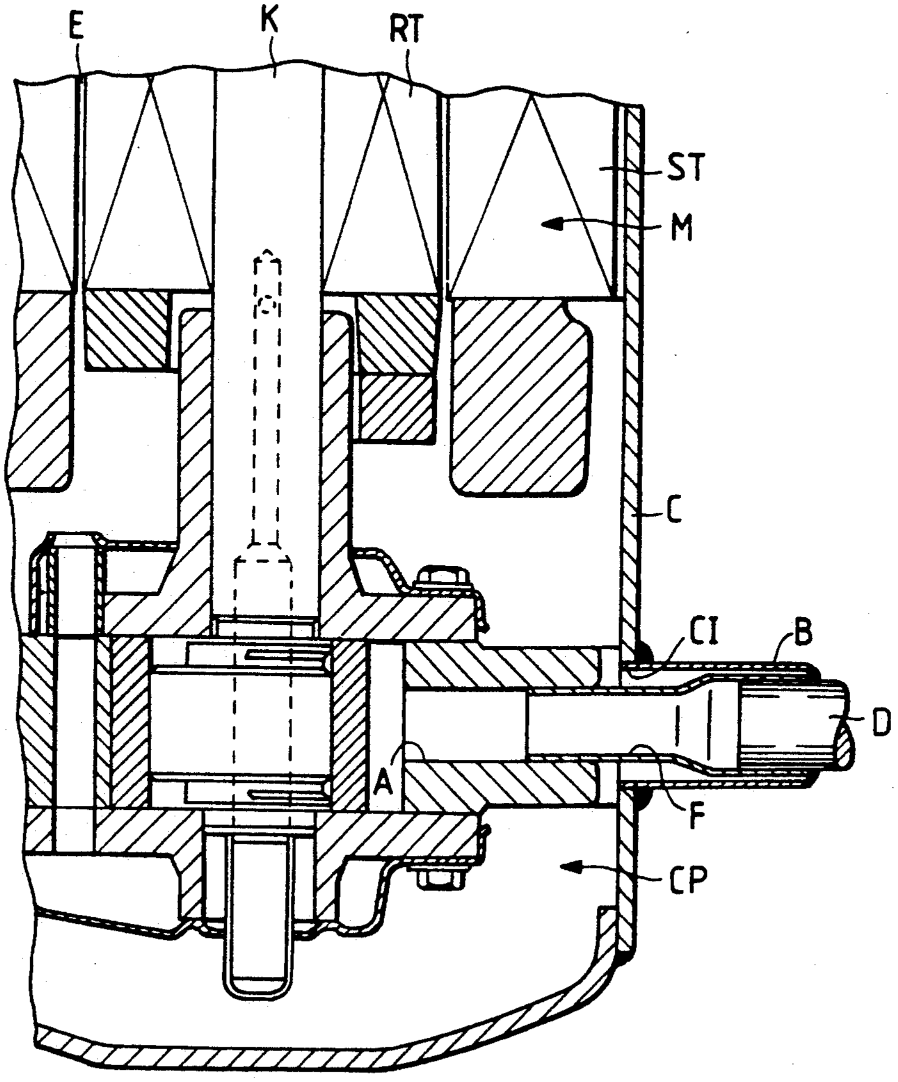
FIG. 3 is an explanatory diagram showing a conventional compressor.

The inlet tube 6 may be modified as shown in FIG. 2. That is, the outer part of the second press-fitting portion 62, which is engaged with the refrigerant pipe 7, is so modified as to have a large diameter portion 63 which is substantially equal in outside diameter to the refrigerant pipe 7 and merges through a step 64 with the inner part of the second press-fitting portion 62. With the inlet tube 6 thus modified, not only the above-described brazing operation, but also a projection welding operation can be performed by utilizing the outer cylindrical surface of the connecting cylinder 11*a* and the outer cylindrical surface of the large diameter portion 63. Hence, even if the welding method is changed, it is unnecessary to change the inlet tube; that is, the inlet tube can be used as it is. In addition, the step 64 can be used to position the inlet tube 6 in inserting the latter 6 into the refrigerant suction opening 31*a*.

The inlet tube 6 may be made integral with the refrigerant pipe 7 which is connected to the accumulator 100. In this case, it is unnecessary to form the inlet tube 6 as a separate component, and accordingly both the number of components and the number of manufacturing steps are reduced as much, with a result that the resultant compressor is reduced in manufacturing cost.

Now, a method of manufacturing the above-described compressor will be described.

First, as shown in FIG. 1, the connecting cylinder 11*a* is protruded outwardly from the connecting opening 11 of the casing 1. The motor 2 is fixedly held in the casing 1, for instance, by shrinkage fitting. Thereafter, the compression element 3 is built in the casing 1 in which the motor 2 has been mounted. In this operation, the compression element 3 is set with the refrigerant suction opening 31*a* of the cylinder 31 held confronted with the connecting opening 11, and a jig is used to prevent the compression element 3 thus set from being moved vertically. Under the condition that the compression element has been positioned with the jig, the first press-fitting portion 61 of the inlet tube 6 is press-fitted into the refrigerant suction opening 31*a* while the second press-fitting portion 62 is press-fitted into the connecting cylinder 11*a*, so that the inlet tube 6 is fixed at the refrigerant suction opening 31*a* and at the connecting cylinder 11*a*. That is, the position of the compression element 3 is prevented from being turned around in the casing 1. After the inlet tube 6 has been fixed in the above-described manner, the casing 1 and the compression element 3 are fixed from outside by spot welding with spot weld 160. Thereafter, the refrigerant pipe 7 is engaged with the inlet tube 6, and the pipe 7 is welded to the tube 6. Under this condition, the inlet tube 6 is welded to the outer end face of the connecting cylinder 11 with the silver ring solder.

In the manufacture of the compressor of the invention, as was described above, in spot-welding the casing 1 and the compression element 3, the element 3 is prevented from being moved vertically and from being turned around because the inlet tube 6 has been press-fitted into the refrigerant suction opening 31*a* and the connecting cylinder 11*a*. Hence, the compression element 3 is prevented from being displaced by the spot welding operation. As a result, the air gap of the motor can be maintained unchanged, and the spot welding operation can be achieved with ease.

As was described above, in the compressor according to the invention, the connecting cylinder 11*a* is formed on the casing 1 in such a manner that it is extended from the connecting opening 11 outwardly of the casing 1, and the inlet tube 6 has the first press-fitting portion 61 which is press-fitted into the refrigerant suction opening 31*a* and the second press-fitting portion 62 which is press-fitted into the connecting cylinder 11*a*. The inlet tube 6 is fixedly secured by being press-fitted into the refrigerant suction opening 31*a* and the connecting cylinder 11*a*; that is, the inlet tube 6 is secured directly to the casing 1. Hence, in manufacturing the compressor of the invention, unlike the conventional one, it is unnecessary to use the coupling pipe, and therefore the number of components is reduced as much; and furthermore the step of connecting the coupling pipe to the casing by brazing is unnecessary, and therefore the number of manufacturing steps is reduced as much, which results in a reduction in manufacturing cost. In addition, in the compressor, it is unnecessary to take into account the effects of heat used for welding the coupling pipe. Furthermore, when the inlet tube 6 is secured by press-fitting it into the refrigerant suction opening 31*a* and the connecting cylinder 11*a*, the compression element 3 is held with respect to the casing 1. Hence, in connecting the compression element 3 to the casing 1 by spot-welding, the air gap between the rotor and the stator of the motor is prevented from being changed during the spot welding operation. Furthermore, in fixing the inlet tube, for instance, by welding, the internal components of the compression element 3 are scarcely affected by heat.

The inlet tube 6 can be more positively connected to the casing 1 which is so modified that the outer part of the second press-fitting portion 62, which is engaged with the refrigerant pipe 7, has the large diameter portion 63 which is substantially equal in outside diameter to the refrigerant pipe 7 and merges through the step 64 with the inner part of the second press-fitting portion 62. That is, the inlet tube 6 thus modified can be connected to the casing 1 not only by brazing but also by resistance welding such as projection welding. Hence, even if the welding method is changed, it is unnecessary to change the inlet tube; that is, the inlet tube can be used as it is.

In the case where the inlet tube 6 is made integral with the refrigerant pipe 7 which is connected to the accumulator, it is unnecessary to form the inlet tube 6 as a separate component, and accordingly both the number of components and the number of manufacturing steps are reduced as much, with a result that the resultant compressor is further reduced in manufacturing cost.

Furthermore, in the compressor of the invention, the outer end face of the connecting cylinder 11*a*,is welded to the inlet tube 6 press-fitted into the cylinder 11*a* with the ring solder 81; that is, an automatic welding operation can be employed. In addition, the heat for welding the refrigerant pipe 7 to the inlet tube 6 is transmitted through the inlet tube 6 to heat the ring solder 81 put on the connecting cylinder 11*a*, and accordingly the period of time required for welding the inlet tube 6 to the connecting cylinder 11*a* is shortened as much. Hence, in welding the inlet tube 6 to the connecting cylinder 11*a*, the effect of the produced heat on the internal components of the compression element 3 is lessened.

In manufacturing the inventive compressor the compression element 3 is set in the casing 1 with the refrigerant suction opening 31*a* held confronted with the connection cylinder 11*a* in such a manner that the compression element 3 is prevented from being displaced vertically (the first step), the inlet tube 6 is press-fitted into the refrigerant suction opening 31*a* and the connecting cylinder 11*a* in such a manner that the compression element 3 is prevented from being turned around in the casing 1 (the second step), the casing 1 and the compression element 3 are fixed by spot welding (the third step); and the inlet tube 6 is fixedly welded to the connecting cylinder (the fourth step). That is, in fixing the compression element 3 and the casing 1 by spot welding, the compression element 3 is prevented from being moved vertically and from being turned around because the ,inlet, tube 6 is press-fitted into the refrigerant suction opening 31*a* and the connecting cylinder 11*a*. Hence, the compression element 3 is prevented from being displaced during the spot welding operation, and accordingly the air gap between the rotor and the stator in the motor is maintained unchanged at all times. This will facilitate the spot welding operation.

While the present invention has been described above with respect to a single preferred embodiment thereof, it should of course be understood that the present invention should not be limited only to this embodiment but various changes or modification may be made without departure from the scope of the present invention as defined by the appended claims.

What is claimed is:

1. A compressor, comprising:

a compression element having a cylinder with a refrigerant suction opening therethrough;

a casing having said compression element built therein, said casing having a connecting opening at a position corresponding to a position of said refrigerant suction opening, and having a connecting cylinder which is formed integrally with said casing such that said connecting cylinder extends from said connecting opening outwardly of said casing;

an inlet tube inserted into said connecting opening and having a first press-fitting portion which is press-fitted into and is in close contact with said refrigerant suction opening of said cylinder and a second press-fitting portion which is press-fitted into and is in close contact with said connecting cylinder, said inlet tube being fixedly secured in said casing when press-fitted into said refrigerant suction opening and said connecting cylinder; and a refrigerant pipe connected to said compression element through said inlet tube, said inlet tube including a portion closely contacting said refrigerant pipe.

2. A compressor as claimed in claim 1, in which said inlet tube has a first diameter portion on the side of said refrigerant pipe which has an outer diameter substantially equal to that of said connecting cylinder and merges through a step with said second press-fitting portion of said inlet tube.

3. A compressor as claimed in claim 1, further comprising an accumulator connected to said refrigerant pipe, said inlet tube being formed integrally with said refrigerant pipe which is connected to said accumulator.

4. A compressor as claimed in claim 1, further comprising a ring solder, wherein said inlet tube press-fitted into said connecting cylinder is welded to an outer end face of said connecting cylinder with said ring solder.

5. A method of manufacturing a compressor in which a compression element having a cylinder with a refrigerant suction opening formed therethrough is built-in to a casing which has a connecting opening at a position corresponding to a position of said refrigerant suction opening, a connecting cylinder is formed integrally with said casing such that said connecting opening outwardly of said casing, and a refrigerant pipe is connected to said compression element through an inlet tube press-fitted into said refrigerant suction opening and said connecting cylinder, said method comprising the steps of:

setting said compression element in said casing with said refrigerant suction opening held so as to confront said connecting cylinder such that said compression element is prevented from being displaced vertically;

press-fitting said inlet tube into said refrigerant suction opening and said connecting cylinder such that said compression element is prevented from being displaced with respect to said casing and such that said inlet tube closely contacts said cylinder of the compression element having said refrigerant sucking hole formed therethrough and said connecting cylinder;

fixing said casing and said compression element by spot welding;

welding fixedly said inlet tube to said connecting cylinder; and connecting said inlet tube to said refrigerant pipe such that said inlet tube has a portion closely contacting said refrigerant pipe.

* * * * *